Patented June 17, 1952

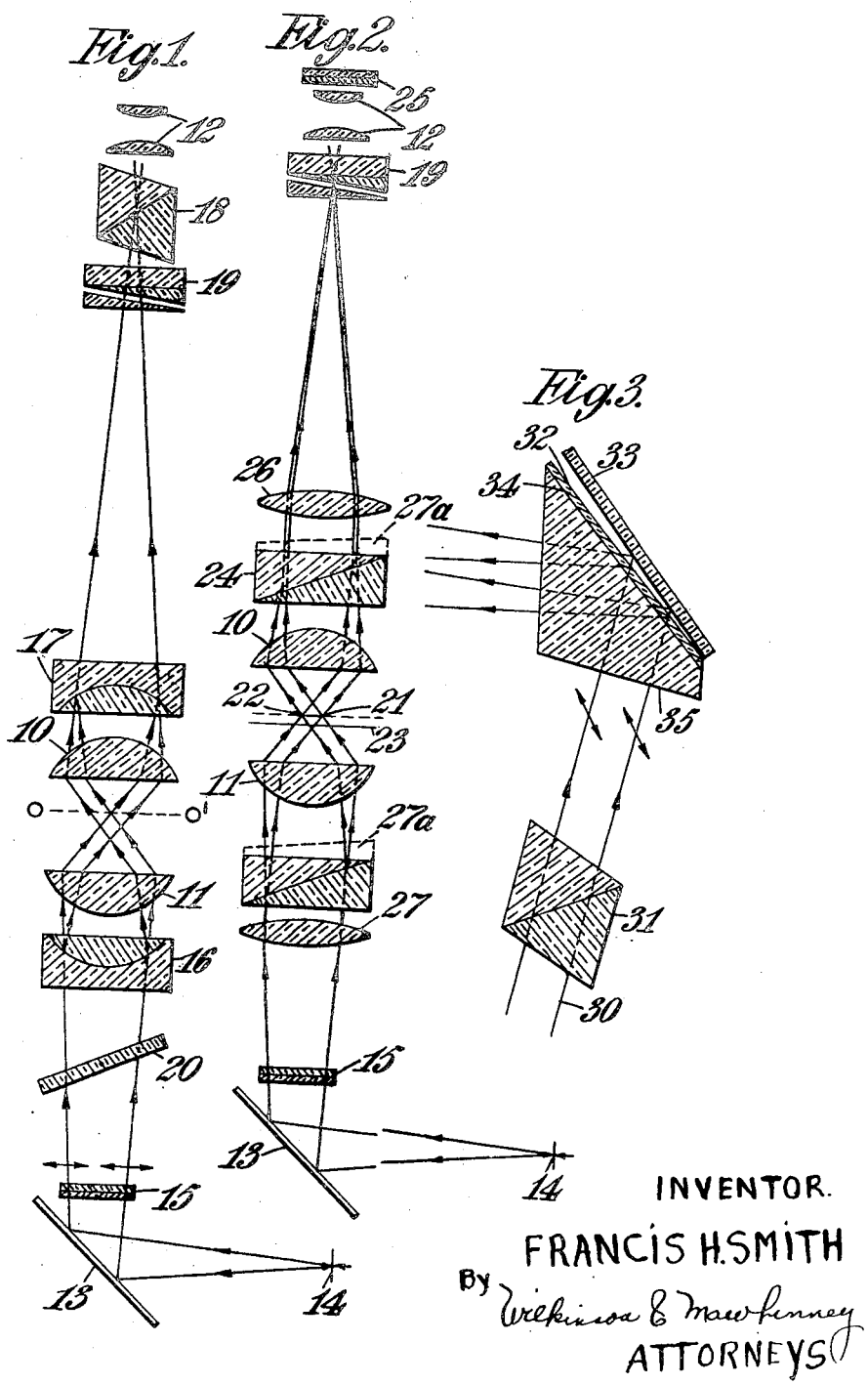

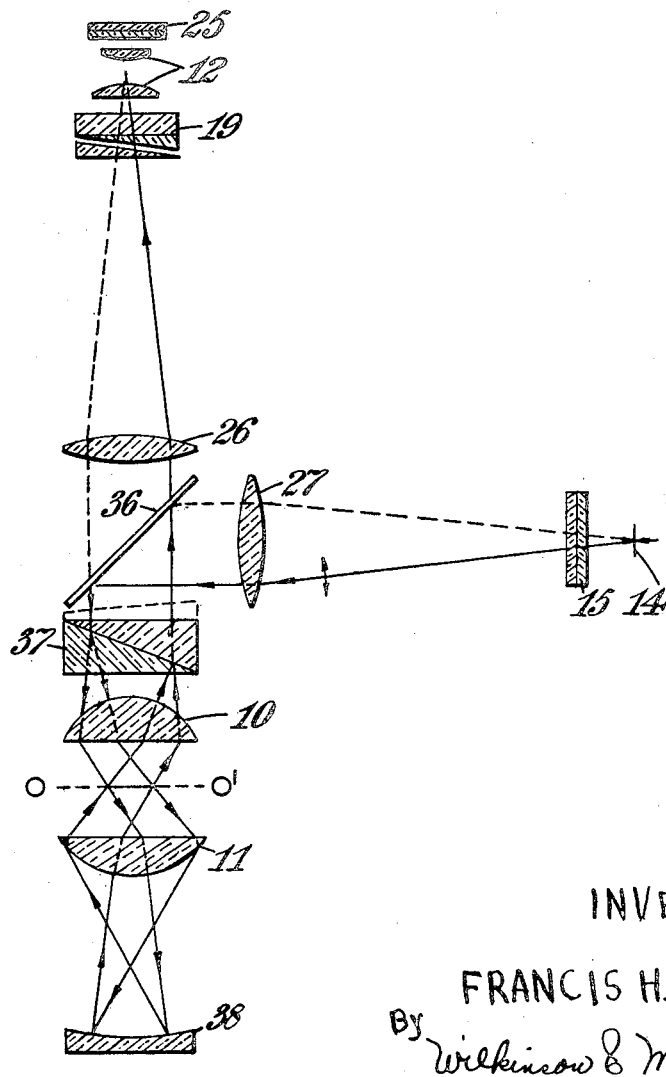

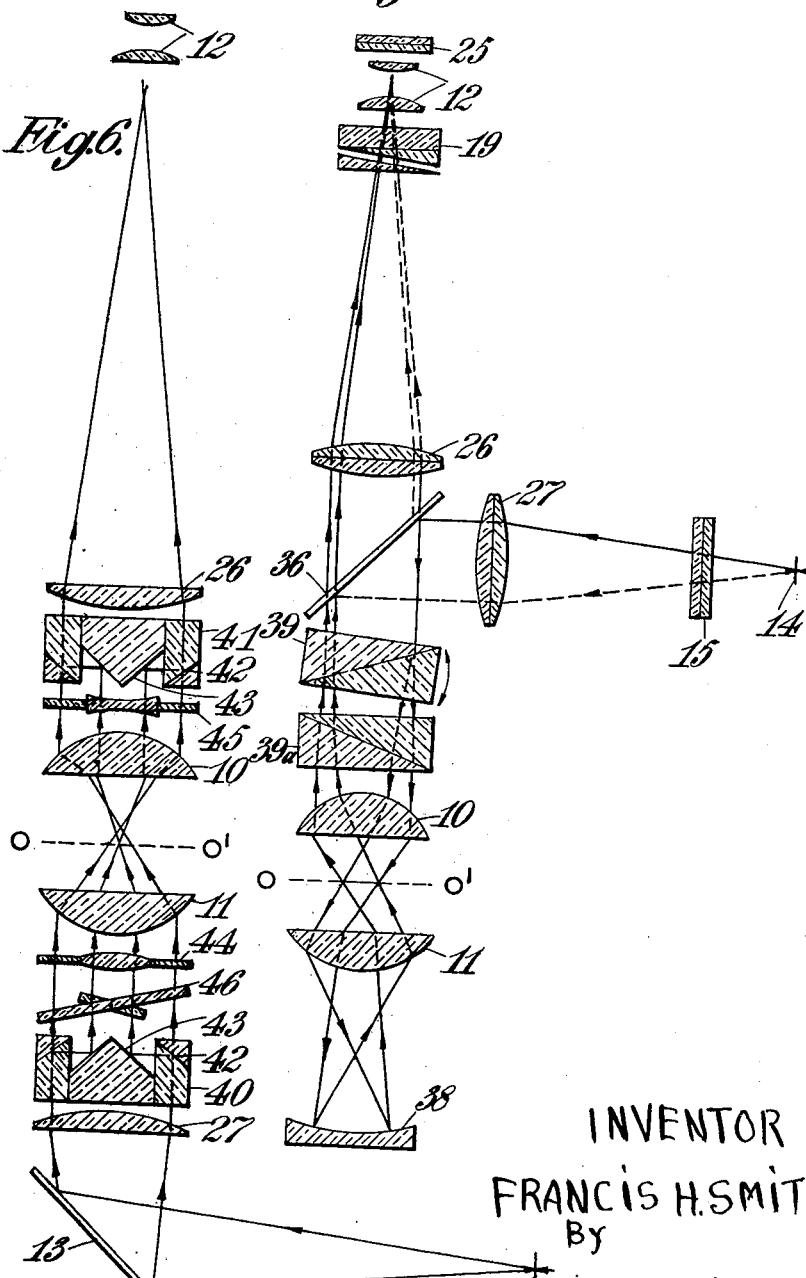

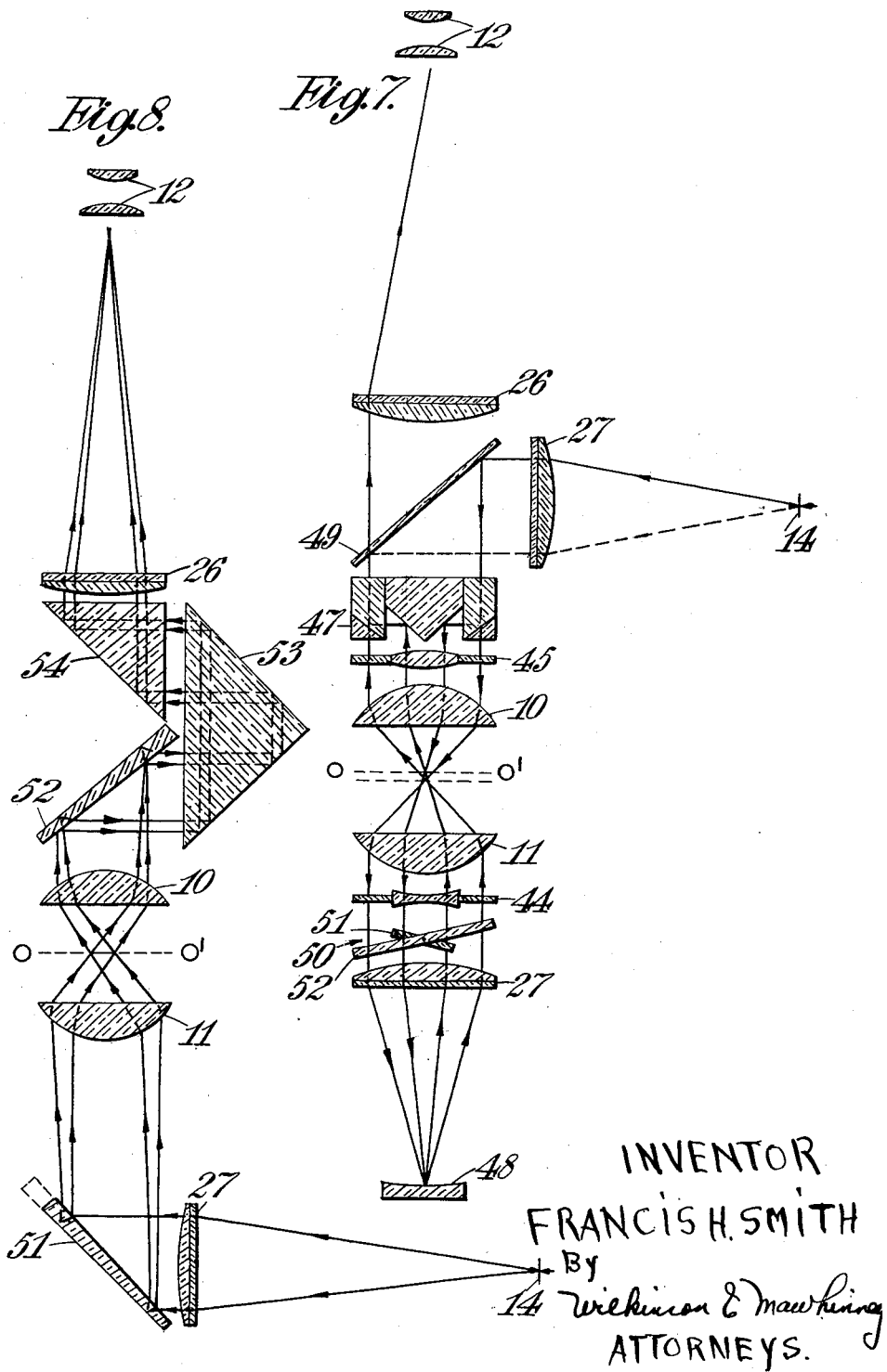

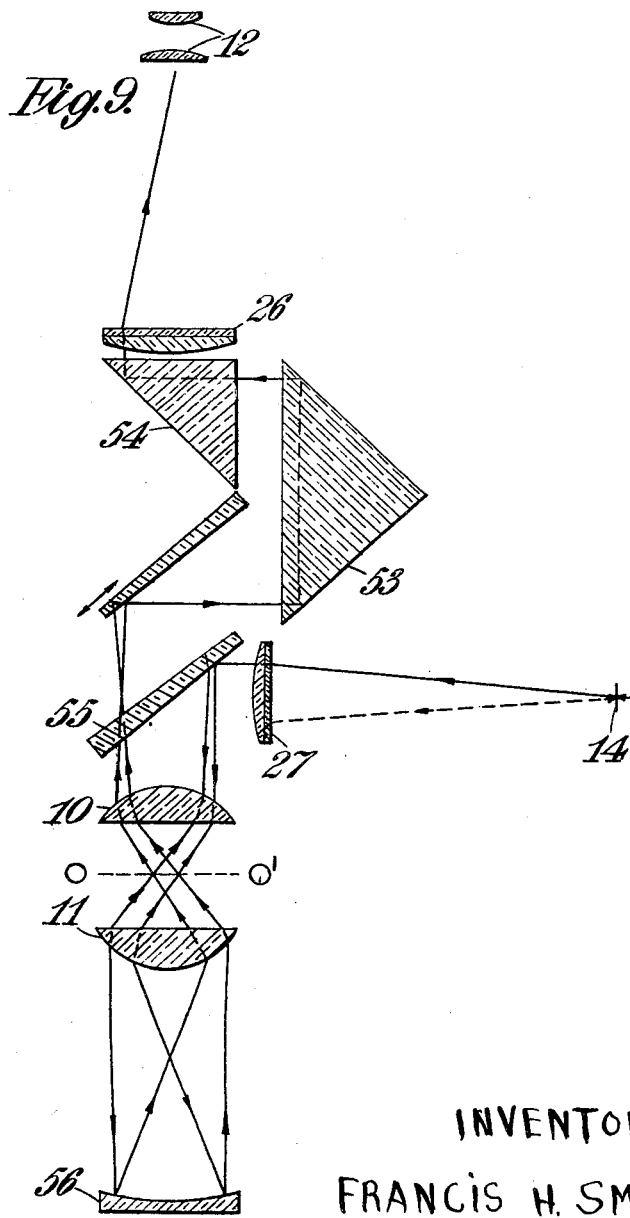

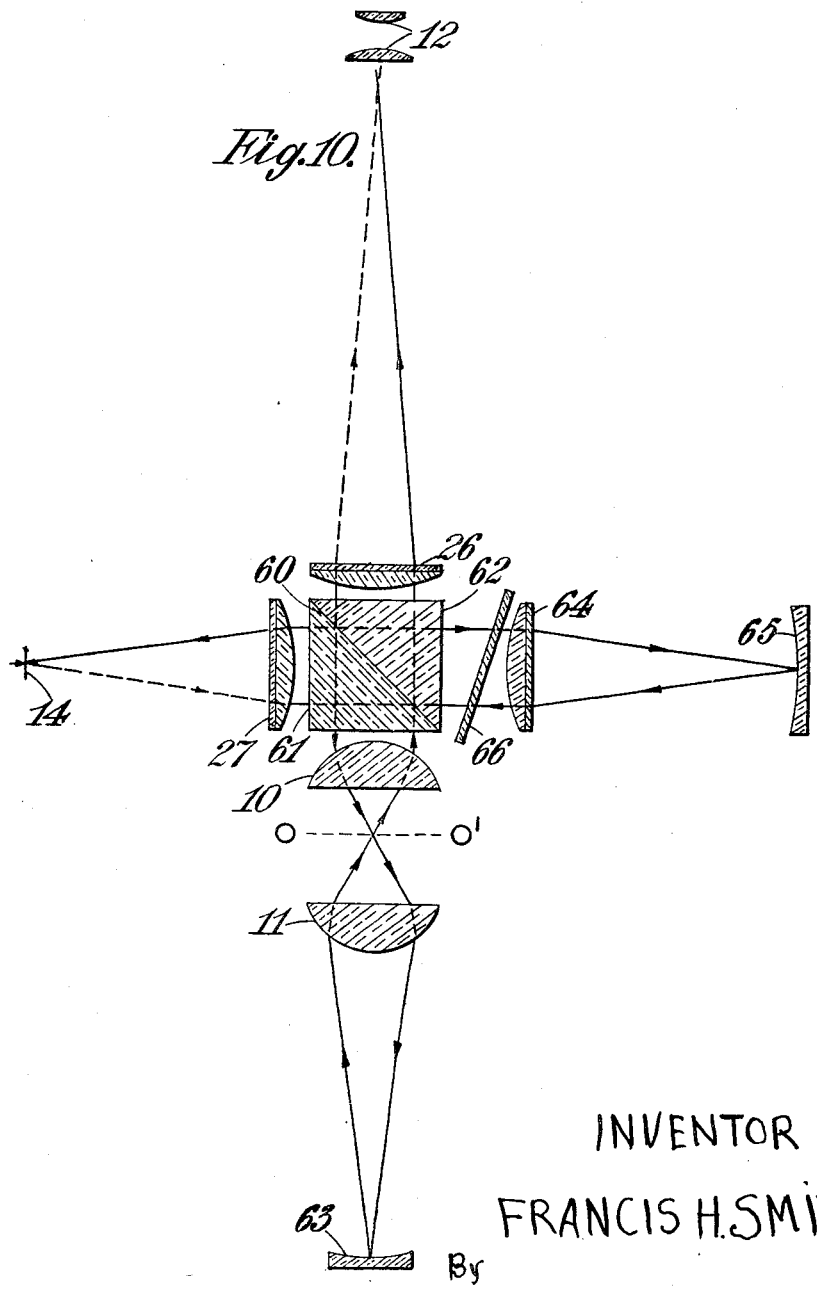

2,601,175

UNITED STATES PATENT OFFICE 2,601,175

INTERFERENCE MICROSCOPE

Francis Hughes Smith, Scarborough, England

Application August 3, 1948, Serial No. 42,170
In Great Britain August 5, 1947

16 Claims. (Cl. 88—39)

This invention relates to microscopy and has particular reference to interference microscopy.

Although translucent objects can be studied comparatively easily under the usual visual microscope, there are obvious difficulties in studying objects which are transparent or nearly transparent. It is usual to stain transparent or like objects in order to render them more visible, but in many cases, however, such a staining technique may destroy or markedly alter the object.

It is an object of the present invention to provide a microscope which can be used to study unstained transparent or nearly transparent objects.

The principles underlying the present invention may be understood by considering two mutually coherent light beams from the same source. In accordance with the usage in the art the term "mutually coherent" is applied herein to a plurality of beams having precise accordance between their luminous vibrations, so that if such beams are appropriately superposed, e. g. by directing them along substantially coincidental paths, the vibrational relationship between them is independent of the sequence of random vibrational changes in the individual beams and visible interference effects may be produced. If both beams traverse paths of equal optical length, then they will not produce interference effects on being combined. However, if the optical path length of one beam is different from that of the other, interference effects may be produced. Such differences in the optical path lengths of the two beams may be caused by allowing the beams to traverse an object to be examined in different manners or by making one beam traverse the object and the other not. These interference effects enable a transparent or like object to be examined more easily than is possible by the use of the usual form of visual microscope.

This effect is achieved in some measure in the well-known phase-contrast microscope in which the object is illuminated by a single beam of light and interference effects are produced in the image plane phase between that part of the beam which passes through the object without deviation and that portion which has been diffracted by the object. However, it is known that only very small refractively differentiated elements of the object are capable of generating a beam sufficiently diffracted for this purpose, so that the phase-contrast method is virtually limited to relatively small features of the object.

The present invention overcomes these limitations of the phase-contrast microscope by utilising the interference effects between two distinguishable beams of light.

Thus, according to the present invention, apparatus for microscopically examining transparent or like objects comprises a compound microscope wherein there are provided means for dividing the object illuminating beam of light into two distinguishable beams, means for subsequently directing at least one of said distinguishable beams through the object so that the optical path lengths of said distinguishable beams differ due to the nature of the object and means for subsequently combining said distinguishable beams so as to produce interference effects.

The means for dividing the object illuminating beam into two beams may be arranged to provide beams mutually distinguishable in respect of their general directions of propagation or their states of dioptric divergence or convergence or the geometrical forms of their cross-sections or with respect to a combination of these properties.

The objective lens of the microscope or the objective lens and condenser lens of the microscope may be disposed optically between the beam dividing means and beam combining means.

The beam dividing means may comprise at least one birefringent lens and/or double refracting double image prism and in these arrangements, means are provided to plane polarise the object illuminating beam of light before it reaches said beam dividing means.

Similarly at least one birefringent lens and/or double refracting double image prism may form the beam combining means and in these arrangements means are provided for bringing the recombined beams into parallel polarized relationship.

Preferably means are provided for adjusting the relative optical path lengths of said distinguishable beams.

Reflecting means may be arranged in the paths of the two divided beams so as to reflect the two beams back through the beam dividing means which thus functions also as the beam combining means and in this arrangement, a vertical illuminator may be provided comprising a partially reflecting surface disposed between the beam dividing means and the eye-piece of the microscope.

The following is a description of a number of embodiments of the invention, reference being made to the accompanying drawings in which—

Figure 1 is a diagrammatic view of one embodiment, the optical elements being shown in conventional manner as a section along the optical axis of the microscope.

Figure 2 is a similar diagrammatic view of a second form of the microscope of the present invention, Figure 3 is a diagrammatic view of a beam dividing unit which is substantially achromatic for both the beams, Figures 4 and 5 illustrate modifications of the microscope shown in Figure 2, and Figures 6, 7, 8, 9 and 10 are diagrammatic views of microscopes in which partially reflecting surfaces are utilised in the beam dividing means.

Referring to Figure 1, the microscope includes, in the conventional manner, an objective lens 10 and an achromatic condenser lens 11 arranged on either side of the object supporting means which is disposed so that the plane of the object is at the position indicated by the dashed line OO'. The eye-piece 12 is also of conventional construction and there is provided the usual sub-stage mirror 13 for directing the light from source 14 through the condenser lens 11. These components are shown in a conventional manner and it will be appreciated that, for example, the condenser and objective normally comprise a number of lens components.

A polarizing screen 15 is arranged in the substage so that a plane polarized beam of light is directed towards the condenser lens 11. Immediately below the condenser is a lens 16 which is constructed of birefringent material or materials so that the lens is bi-focal. For example, the positive lens element may be made from calcite which has a shorter focal length for the ordinary rays than for the extraordinary rays, the refractive index of calcite being in general greater for the ordinary than for the extra-ordinary rays. Thus, as is shown in the figure, the incident light is divided into two beams which, as is well known, are polarised in planes at right angles to one another. The condenser lens 11 brings these two beams to separate foci at points spaced apart along the optical axis of the microscope and it will be noted that one of these foci is in the plane OO' in which the object is supported by the stage of the microscope.

A second lens 17, also of birefringent material and of opposite dioptric power to lens 16, is disposed between the objective 10 and the eye-piece to combine the two beams and bring them to a common focus where an image is formed which is viewed through the eye-piece. If a cross-section in the object plane is considered, it will be realised that the light passing this plane comprises an inner beam of one plane of polarization, which is brought to a focus on the object and an outer beam of a transverse plane of polarization which is not in focus on this plane and which surrounds the inner beam. Thus one of the beams passes through the object, whilst the greater part of the other does not. As described above, these two beams when combined will produce interference effects at the image plane of the microscope. To enable these beams to interfere, their planes of polarization must be parallel and an analyser 18 is provided to enable the planes of polarization to be adjusted to parallelism. The interference effects which are produced will depend on the nature of the path through the object being examined and will be seen when viewed through the eye-piece coincident with the image of the object.

If the light employed is white light or a mixture of lights of various wavelengths, the interference effects record themselves as colour variations. If monochromatic light is used then the interference effects show up as intensity variations.

Preferably the analyser 18 is made rotatable so that the maximum interference contrast can be obtained.

It will be appreciated that the cause of interference between the two components of the recombined beams is the difference in optical path lengths of one beam with respect to the other, due to its having traversed the object. Ideally, the optical path lengths of the beams, when they reach the eye, viewing screen, or photographic emulsion should not differ by more than a few wavelengths of light. In practice it is normally necessary to provide an optical path length compensating means which should preferably permit of very fine adjustment so that the best interference contrast can be obtained for the particular part of the object under examination. The compensating means may advantageously be calibrated in terms of differences in optical path length making the system more precisely informative. For example, a Soleil-Babinet compensator 19 may be introduced at a suitable point in the system, for example, immediately beneath the analyser as shown in the drawing. As an alternative form of compensator, a tilting birefringent retarding plate compensator 20 could be used. This could be mounted in any convenient position between the polariser and analyser, for example, between the polarizing screen 15 and the beam dividing means 16.

When, as has been described above, the bifocal lenses are made to be used in addition to existing objective and condenser lenses, each bifocal lens would consist of two or more elements which may be cemented together and which have a mean power for both beams which is very small. For example, it is recommended that a lens to be added to an objective should be of zero power for the beam which the condenser has focussed in the plane of the object being examined. The precise amount of bi-focal dioptric power employed cannot be laid down but for the objective the difference between the dioptric power for one beam and that for the other may well be in the region of plus or minus three diopters. Once the bifocal power of the objective's bi-focal lens has been decided upon, that for the condenser lens can readily be computed for any particular combination of objective and condenser from the ratio of the dioptric powers of each such pair by the well known formulae relating to the geometrical optics of lenses. As a close approximation it may be taken that the ratio of the dioptric bi-focal powers of the condenser's bi-focal lens to the dioptric power of the condenser should be equal to the corresponding ratio for the objective and its bi-focal lens. In its simplest form, each bifocal lens would consist of a positive and negative lens element, one made from calcite and the other from glass, the latter being designed to correct the chromatic aberration of the calcite element for one of the two beams, for example, the beam formed by the ordinary rays. It will be appreciated that this correction for dispersion is only necessary for one beam if the object to be examined is always viewed in that beam.

In the case of low and medium power objectives, the birefringent lens may be mounted in a sleeve by means of which it can be slid into the usual mounting of the objective. In this way a single lens unit would suffice for at least two objectives, although the corresponding condenser lens would have to be changed unless the power of the condenser would be correspondingly changed by adding or subtracting lens components forming part of the condenser lens train. Preferably, the birefringent lenses are located as near as possible to the back focal planes of the objective and condenser with which they are associated, and should, in any case, be mutually conjugate. In the case of the higher powers, this means that they may have to be fitted between two lens elements of the condenser and/or of the objective. It may be found advantageous to make special condensers and objectives fitted with these additional birefringent lenses and, these lenses may not be additional but, in fact, form an essential part of the lens train. For this purpose, quartz may be a more convenient material than calcite in spite of its comparatively low birefringence owing to the fact that its indices of refraction are nearer to those of the glasses commonly used in most objectives and condensers.

Although this instrument has been described as having an eye-piece 12, it is readily apparent to all those skilled in the art that it or any of the other microscopes to be described hereinafter may be modified to provide a viewing screen or be adapted for photography.

Instead of using birefringent lenses, it is possible to use double refracting, double image prisms, as illustrated in Figure 2. In this microscope, the objective 10, condenser 11, eye-piece 12, mirror 13, light source 14 and polarizing screen 15 are arranged as before. Between the condenser and mirror is disposed a double refracting double image prism, for example, a Wollaston prism, which divides the incident beam of light into two mutually divergent beams which are polarized in planes at right angles to one another. As is clearly seen in the figure, these two beams are brought to foci at points 21, 22 spaced apart in a plane transverse to the optical axis. The condenser is adjusted to bring these foci into the plane OO' in which the object is supported by the stage 23 of the microscope.

The two beams emerging from the objective pass through a second double image prism which causes them to combine so that they are brought to a focus at coincident points. As in the previously described embodiment, the viewing means must include an analyser 25 which in this case is illustrated as a polarizing screen disposed immediately over the eye-piece. Phase adjustment is provided as before, for example, by means of the Soleil-Babinet compensator 19. A pair of collimating lenses 26, 27 may be provided in the positions shown if required.

A Wollaston prism deviates both beams and so introduces dispersion. This is corrected for by the additional prisms 27a shown in dotted lines which are made from a glass whose dispersion is suitably high and which are cemented to the double image prisms. With these prisms added one of the coplanar foci would be located substantially on the optical axis of the microscope as shown in the drawing.

On the other hand, a Rochon variety of double image prism might be used. This form of prism is achromatic for one beam, namely, for the beam which does not deviate and hence it requires no chromatic correction but the large phase difference which it introduces (since only one of its elements is substantially double refracting) must be balanced out. The preferred means for this purpose is a birefringent plate made from the same material as that of the double refracting element of the prism but orientated so that its relative retarding effect opposes that of the said element, the plate being made about the same thickness as that of the double refracting element of the prism in the region of the optical axis of the microscope. This phase balancing plate can conveniently be cemented to one of the exposed surfaces of the prism.

As is well known, there are double image prisms similar to the Rochon prism in so far as only one of the two prismatic elements is double refracting but the element which is not double refracting is made of glass. Such prisms may readily be adapted to the present forms if the glass element is designed to achromatize the other double refracting element for one of the two beams.

The angle of the prismatic elements, of whatever form of double image prism is used, will depend on the strength of the birefringence of the material employed and upon the angular field over which the condenser and objective retain their correction. If the prism is a Rochon prism made from calcite (the preferred material) a convenient angle may be in the region of 6 degrees for the prism associated with the objective. Once the angle for the objective part has been decided upon, that for the prism associated with the condenser can be computed from the known focal length relationship between the objective and the condenser. Only if the focal lengths of these lenses be equal can the angles of the corresponding prisms be equal. For example, if the focal length of the condenser is twice that of the objective, then the angles of the prism associated with the condenser must be such as to produce half the angular deviation of that produced by the objective prism. In general, the angles of the prism must be such that their angular deviations are proportional to the dioptric powers of the objective and condenser with which they are respectively associated.

If it is found desirable to be able to view the object with either of the two beams chromatic correction to the prisms should be provided for both beams. This may be achieved by making the correcting prismatic element from birefringent material whose birefringent dispersion differs substantially from that of the double refracting element or elements in the prism. For example, the element or elements in the prism might be made from quartz while the correcting element is made of calcite. In Figure 3, there is illustrated a unit which is substantially achromatic for both beams, functioning on the selective total reflection principle which is met with in the Nicol's polarizing prism. The illuminating beam which is polarized by means of the polarizer 31 is directed upon a calcite air surface 32 at an angle which is greater than the critical angle for one of the two plane polarized beams into which the calcite divides the initial beam but less than the critical angle for the other beam. A surface mirror 33 is mounted in close proximity to the aforementioned calcite air surface but slightly inclined to this surface so that the beam which is transmitted through the calcite air surface is reflected back into the calcite after which it proceeds in the same general direction as the totally reflected beam but slightly divergent therefrom. Since this is a reflecting unit, it may conveniently be mounted immediately over the microscope's mirror 13 whose function it would thus replace. A similar unit would be mounted above the objective to combine the beams and would be associated with an additional reflecting system to direct the combined beams up the tube of the microscope. This form of unit is specially adaptable to the vertical illumination form of the microscope which will be described below for it may perform the function of the vertical illuminator as well as that of the beam dividing and combining means. A further feature of the unit, which is also particularly applicable to a microscope with a vertical illuminator, is that the inclined surface mirror may be made tiltable so that the amount of angular deviation may be controlled. Like the Rochon form of prism, this unit introduces a large phase difference between the two beams which may be balanced out by means of a birefringent plate or plates, although in the case of the first mentioned variable form, a wide range of birefringent compensator would have to be employed so that the phase relationship could be kept constant when the plate has been tilted. The calcite air surface in the unit illustrated in Figure 3 is formed by cementing a thin calcite plate 34 to a suitably shaped glass prism 35 and in the case of the non-variable form, the thickness of the plate 34 could be such as to balance out the excessive phase difference. In this latter case, the plate would have to be of substantial thickness.

Another means of obtaining variable deviation between the two beams consists in making each of the dividing and combining parts comprise a pair of double refracting double image prisms mounted one above the other so that their deviations are in opposition. Then, by providing a rocking movement for at least one of the prisms, the deviation could be varied. Even in the non-variable form which is illustrated in Figure 2, it is preferable to mount at least one of the prisms, so that it may be rocked in order to facilitate the optical matching of the parts for the objective and condenser with which they are associated.

It will be appreciated that it would be possible to make the two beams so widely spaced in a plane transverse to the optical axis that separate objective and condenser lenses could be used for each beam. If the beams have been so separated they can be deviated, for example by prisms, to increase the separation and thus an instrument can be constructed having little or no restriction on the linear dimensions and form of the object under examination.

However, it is not essential for the two beams to be separated so that only one passes through the object being examined. If the two beams are slightly separated corresponding parts of the beams will pass through different parts of the object and thus be subject to different phase shifts and hence interference effects would be produced.

In the arrangement illustrated in Figure 2, the phase adjustment between the two beams is effected by means of a Soleil-Babinet compensator. As has been described with reference to Figure 1, a tilting Berek plate compensator might be employed for this purpose. This phase adjustment may also be made by providing a sliding horizontal movement to one of the double refracting double image prisms, the movement being parallel to the principal section of the prisms. If this method, which eliminates the necessity for a separate compensator, is adopted the prism must be larger than the diameter of the aperture with which it is associated. Whatever form of phase adjuster is employed it is recommended that it be calibrated, for example, in terms of optical path length.

It may be found that, when high power objectives are used to examine thick objects, the interference contrast is impaired owing to the object modifying the corrections of the objective for the beam which has passed through it, since the object is equivalent to a change in cover glass thickness. In the embodiments illustrated in both Figures 1 and 2, both beams pass through the objective so that it may be necessary to adjust its corrections for one beam in a different manner from the other beam. This adjustment is quite apart from the aforementioned phase adjustment and the preferred method of effecting it consists in providing an additional lens or lenses made from birefringent material so that the dioptric states of the two plane polarised beams are altered to different extents. Variations in this correction could be effected by providing means for sliding the additional lens or lenses relative to the objective along the axis of the microscope. If the additional correcting part consists of more than one lens these could be moved towards or away from one another. It will be appreciated that this method of correction can be applied only when the two beams are polarised in mutually perpendicular planes, as is the case in the arrangements illustrated in Figures 1 and 2.

In the case of systems such as that illustrated in Figure 2, it may be found that the visual field is crossed by a series of interference bands due to the two beams passing through the condenser and objective in different directions. If this effect is found objectionable it can be eliminated by means of a quartz wedge of suitable angle mounted, for example in the occular as is common practice with polarising microscopes. Such a wedge may be arranged to slide horizontally to perform the additional function of adjusting the overall phase relationship between the two beams.

As has been indicated above, the microscope of Figure 2 can be modified into a reflex version such as is illustrated in Figure 4. The light from the source 14 passes through a polarising screen 15 and a collimator lens 27 (if required) to a partially reflecting surface 36 which forms a vertical illuminator. The prism 37 produces the required two beams as before which are then focussed in the plane OO' by the objective 10, the object to be examined being situated at one of the foci. The light then passes through the condenser lens 11 to a reflecting surface 38. The condenser lens is adjusted so that it forms an image of the object on or near the mirror whose surface is substantially normal to the incident beams. As a result of this arrangement the beams are reflected back to the object through the condenser and pass through the objective to form the real image of the object in the image plane of the objective. This is viewed as before by means of the eyepiece 12 and analyser 25. In this arrangement it is not necessary to make the prism rockable for matching purposes since the single prism 37 serves the double function of dividing and combining the beams. However, it may be advantageous to mount the prism (which is between the objective and the vertical illuminator) at a small angle of inclination to the optical axis of the microscope so as to divert reflections from its surfaces away from the image of the object.

For the present purpose these reflex systems have the advantage over the direct transmission forms in that the beam dividing unit, located between the vertical illumination and the objective, also performs the function of beam recombination. However, the focussing of the condenser is made almost as delicate as that of the microscope body. This disadvantage can be overcome by providing a focussing stage so that once the condenser has been correctly focussed, the object can be focussed without disturbing the condenser.

For convenience and neatness it is desirable that the mirror 38 should be mounted in the sub-stage e. g. immediately over the usual microscope mirror. The usual microscope mirror might be adapted for the present purpose so dispensing with the need of an additional mirror. However, corrected condensers are usually corrected for a distance far in excess of that required for either of these arrangements and it becomes necessary to provide an additional lens or lenses to effect the required change in the correction of the condenser. Alternatively, a condenser provided with a correction collar may be employed. The effective focal length of the mirror should be made approximately equal to its distance from the back focal plane of the condenser. Ideally, a special concave mirror should be provided whose radius of curvature is about the same as the distance of the mirror from the aforesaid back focal plane. The required focal length may be obtained by mounting a lens or lenses immediately above, for example, a plane mirror but it will be appreciated that surface mirrors are preferable. In all these reflex forms of microscope, it is proposed that the effective area of the light source be kept small relative to the field of vision in the ocular in order to minimize flare caused by reflections from the several reflecting surfaces.

In this arrangement, phase adjustment may be effected in the same way as has been described with reference to Figure 2 e. g. by sliding the prism 37 in a plane transverse to the optical axis of the microscope or by a separate compensator such as the Soleil-Babinet compensator 19 (shown in Figure 4) or a tilting birefringent retarding plate compensator. Coarse phase adjustment could be effected by rocking the beam returning mirror 38.

There is illustrated in Figure 5, a modification of the arrangement of Figure 4, in which the single prism 37 is replaced by a pair of prisms 38, 39, which are arranged so that their deviations are in opposition. One of the prisms is mounted so that it can be rocked. In this reflex version, the beam dividing and combining are performed by the same components and the rocking of the prism is not for matching purposes (as was mentioned with reference to Figure 2) but to enable the separation of the beams to be made variable.

In all the arrangements hereinbefore described, it is preferred that the beam dividing and combining means should be mounted in slides so as to facilitate obtaining the required accuracy of orientation. This is particularly the case when these dividing and combining means are separate, as for example, in Figures 1 and 2. If these dividing and combining means are fitted into the mountings of the condenser and objective it is desirable to mount the objective and condenser on slides.

It will be appreciated that the two basic arrangements illustrated in Figures 2 and 4 provide different means for separating the two images of the light source, in one arrangement the separation being along the axis of the microscope and in the other case in a plane transverse to the axis. By using both birefringent lenses and double refracting double image prisms it is possible to form the images of the light source at separate points, which are neither co-axial nor co-planar.

Many other methods may be employed to divide and recombine the two beams. For example, one form of dividing and combining device which may be employed is a diffraction grating or zone plate. Such a device gives rise to a number of diffracted beams but for the purpose of the present invention these may be regarded as one beam since they can be caused to pass round the outer boundary of a small object. The central undiffracted beam is arranged to pass through the object and one or more of the diffracted beams which pass around the object are directed back to the central beam by means of a second grating which functions as a combining device. Phase adjustment is more difficult with the grating or zone plates than with the systems previously described but may be facilitated by providing means for polarizing the central undiffracted beams in a plane perpendicular to that of the diffracted beams before the object is reached so that their phase relationship could be controlled by birefringent retarding plates or birefringent compensators. This might be done by making the grating of birefringent material. For example, a plate of calcite, cemented to a glass plate, could be ground down to an extent such that it introduces a phase difference of about half a period between its ordinary and extraordinary components. The calcite plate would then be converted into a diffraction grating or zone plate by etching away alternate strips or concentric circles by means of an etchant which erodes only the calcite and not the glass or cement. The surface of the grating or zone plate would then be immersed in a fluid or cement whose index of refraction is as near as possible to that of one of the two principal indices of the calcite. This fluid or cement would in turn be covered and contained by a plate of glass. The resulting device would be substantially equivalent to a plain glass plate for one of the plane polarised components of the calcite but would be a half wave grating (or zone plate) for the other component. Now, it is known that an ordinary half-wave grating concentrates practically all the light into the diffracted beams so that there is almost no light in the central undiffracted beam. In consequence the present device will provide a central beam polarised in one plane and diffracted beams polarised in a plane perpendicular to that of the central beam. Hence the phase relation between the two beams can be adjusted by a birefringent compensator as in the double refracting interferometer microscopes described above.

Yet a further method of dividing and recombining the beam is employed in the microscope illustrated in Figure 6. The objective 10, condenser 11, eye-piece 12, sub-stage mirror 13 and light source 14 are again arranged in the conventional manner and collimating lenses 26 and 27 may be provided as in the arrangements described above. The beam dividing means 40 and the beam combining means 41 are similar and are each provided with an internal partially reflecting conical surface 42 and a second reflecting conical surface 43 so that an incident beam falling on the outer part of the beam dividing means 40 is divided into a central beam and an outer surrounding beam. It may be noted that incident light falling on the inner part of the device will be totally reflected from the inner side of surface 43 and will have no effect. The lenses 44 and 45 each comprise an inner lens for the central beam and an annular lens for the outer beam. The inner beam is thus brought to a focus on the object plane OO' whilst the outer beam is focussed at a point spaced axially away from the object plane. The two beams are combined by the combining device 41 so that coincident images of the light source are formed which are viewed through eye-piece 12, the interference effects between the two beams being obtained as before. The lenses 44 and 45 may be omitted in which case both the beams will be brought to one and the same focus in the plane of the object but will pass through the object at different mean angles. The path lengths of the two beams through the object will thus differ and no interference effects will be produced as before.

It will be appreciated that it is not essential that the inner beam be circular and the outer annular so long as one beam surrounds the other. The outer beam may comprise a number of separate parts. Thus the reflecting surfaces 42 and 43 could be pyramidal instead of conical.

Since this system does not use polarised light beams, phase adjustment of the two beams cannot be effected by the compensators previously described and instead there may be used a rocking plate 46 (as with the Jamin compensator) or a sliding wedge. As with the previously described compensators these would preferably be calibrated in terms of optical path length.

As is illustrated in Figure 7, the arrangement of Figure 6, may be modified to a form with vertical illumination by using a vertical illuminator 49 to direct the incident beam of light through a single beam dividing means 47 which also functions as the beam combining means (as in the microscope of Figure 4). The two beams pass through the double lens 65 and the objective 10 and are brought to foci separately at points spaced axially. The object is supported at one of these foci in the plane OO'. The two beams continue through the condenser 11, double lens 44 and collimator 27 which bring them to a focus on the mirror 48. This mirror is arranged to reflect the beams back along the same paths so that they are again brought to a focus separately at the same two axially spaced points. The device 47 combines the two beams and focusses them to form coincident images of the light source which are viewed through the eye-piece 12, interference effects being observed as before. For phase adjustment there is provided a rockable plate 59 having an inner part 51 for retarding the inner beam and outer part 52 for retarding the outer beam.

The double lenses 44 and 45 may be removed when it is desired to use the microscope as a difference of path length systems in the same manner as has been described with reference to Figure 6.

In Figure 8 there is shown another method of producing two co-planar images of the light source. In this case, use is made of reflections from the two surfaces of a wedge 51 to separate the light into two beams and a similar wedge 52 is used for recombining the beams. Two prisms 53 and 54 are used as total reflectors in order to bring the combined beam back to the tube of the microscope. The wedge 51 is made slidable in order to enable adjustment of the phase relationship between the beams to be effected.

This arrangement may also be modified into a "reflex" system as is shown in Figure 9. In this case the wedge 55 acts as the partially reflecting surface as well as forming the beam dividing device. The light passes through the objective 10 and condenser 11 to the mirror 56 and is reflected back as in the previously described vertical illumination systems so that the beams are brought to a focus by the condenser 11 at the same spaced points as they are brought to a focus by the objective 10. In this arrangement the wedge 55 does not function to recombine the beams and a second wedge 57 is provided for this purpose.

Yet a further form of beam dividing means is illustrated in Figure 10. In this case use is made of the partially reflecting internal surface 60 between two prismatic elements 61, 62 which are cemented together. The reflected light passes through the objective 10 and condenser 11 to the mirror 63 whilst the transmitted light passes through the positive lens 64 to the reflecting surface 65. The two beams return by the same paths and are combined by the prismatic elements 61, 62 in a manner which is obvious from the figure.

In this arrangement, a rocking plate 66 is provided to effect fine phase adjustment, the coarse adjustment being made by movement of the mirror 65.

As has been mentioned above, when high power objectives are used to examine thick objects, the interference contrast may be impaired owing to the object modifying the corrections of the objective for the beam which has passed through it and so it becomes necessary to adjust the correction of the objective for one beam in a different manner from the other. In the arrangements described with reference to Figures 11 and 12 only one beam passes through the objective and this correction can readily be made by fitting the condenser with a correction collar.

Although in most of the arrangements described above, the beam dividing and combining means are closely associated with the objective or objective and condenser this is not essential for carrying out the invention. For example, in the arrangements described with reference to Figures 1 and 2, the combining double image prism or birefringent lens might be mounted close to or immediately above the eye-piece. Ideally the combining means should be located at a real image of the dividing means. If mounted immediately above the eye-piece, in or near the Ramsden circle, a polarizing screen should be used as analyser so that the eye may be placed as near to the Ramsden circle as possible.

If, as for example, in the instruments illustrated in Figures 1, 2, 4 and 5, two polarised beams are employed, it is essential that the illuminating beam should be plane polarized and that there be an analyser between the last birefringent element and the eye, viewing screen or photographic emulsion.

I claim:

1. In combination with a compound microscope comprising in combination means for supporting an object at an object position, means for providing a beam of rays of light for illuminating the object, a condenser for concentrating the beam on to the object position, an objective focussed on to the object position for receiving the beam after it has left the object position and producing an enlarged real image of the object, and means for viewing the image, ray-dividing means, situated in the path of the beam before it reaches the object position, for dividing each ray in the beam into at least two coherent component rays and directing said two component rays along mutually different paths within the beam, and ray-combining means, situated in the path of the beam after it has left the object position, for directing said two component rays along colinear coincidental paths in the beam, which ray-combining means comprises a member which presents mutually different optical path lengths to said two component rays, the difference between the optical path lengths presented to said two component rays being different from the corresponding mutual differences between the optical path lengths presented by said member to other pairs of coherent component rays derived from other rays in the beam, whereby when a transparent object to be examined and comprising portions having mutually different optical thicknesses is supported at the object position the image exhibits coincidentally viewable interference effects corresponding to the said portions of the object and resulting from the modification by the object of the relationship between the path lengths of at least one pair of the said mutually coherent component rays.

2. In combination with a compound microscope comprising in combination means for supporting an object at an object position, means for providing a beam of rays of light for illuminating the object, a condenser for concentrating the beam on to the object position, an objective focussed on to the object position for receiving the beam after it has left the object position and producing an enlarged real image of the object, and means for viewing the image, ray-dividing means, situated in the path of the beam before it reaches the object position, for dividing each ray in the beam into at least two coherent component rays and directing said two component rays along mutually different geometrically distinguishable paths within the beam, and ray-combining means, situated in the path of the beam after it has left the object position, for directing said two component rays along colinear coincidental paths in the beam, which ray-dividing means and ray-combining means each comprise a member having light-transmitting surfaces at at least one of which the said ray-division and ray-combination is effected, and which presents mutually different optical path lengths to said two component rays, the difference between the optical path lengths presented to said two component rays being different from the corresponding mutual differences between the optical path lengths presented by said member to other pairs of coherent component rays derived from other rays in the beam, whereby when a transparent object to be examined and comprising portions having mutually different optical thicknesses is supported at the object position the image exhibits coincidentally viewable interference effects corresponding to the said portions of the object and resulting from the modification by the object of the relationship between the path lengths of at least one pair of the said mutually coherent component rays.

3. In combination with a compound microscope comprising in combination means for supporting an object at an object position, means for providing a beam of rays of light for illuminating the object, a condenser for concentrating the beam on to the object position, an objective focussed on to the object position for receiving the beam after it has left the object position and producing an enlarged real image of the object, and means for viewing the image, ray-dividing means, situated in the path of the beam before it reaches the object position, for dividing each ray in the beam into at least two coherent component rays and directing said two component rays along mutually different paths within the beam, and ray-combining means, situated in the path of the beam after it has left the object position, for directing said two component rays along colinear coincidental paths in the beam, which ray-dividing means and ray-combining means each comprises a member which presents mutually different optical path lengths to said two component rays, the difference between the optical path lengths presented to said two component rays being different from the corresponding mutual differences between the optical path lengths presented by said member to other pairs of coherent component rays derived from other rays in the beam, whereby when a transparent object to be examined and comprising portions having mutually different optical thicknesses is supported at the object position the image exhibits coincidentally viewable interference effects corresponding to the said portions of the object and resulting from the modification by the object of the relationship between the path lengths of at least one pair of the said mutually coherent component rays.

4. A combination according to claim 3, wherein the algebraic sum of the differences between the optical path lengths presented by the ray-dividing means and ray-combining means to each said pair of coherent component rays in the beam is the same for the pairs of component coherent rays derived from substantially all the rays in the beam, whereby in the absence of an object each pair of coherent component rays has the same mutual phase relationship as the other pairs of coherent component rays on leaving the ray-combining means.

5. A combination according to claim 3, wherein the condenser and the objective are constituted by one and the same lens system, wherein the ray-dividing means and ray-combining means are constituted by a single means, and which combination also comprises reflecting means situated in the path of the beam, after it has left the object position, for directing the beam back to the said lens system, and a vertical illuminator situated in the path of the beam, between the beam-providing means and the said lens system, for directing the beam from the beam-providing means on to the said lens system while permitting the beam to pass the vertical illuminator to the image-viewing means.

6. A combination according to claim 5, wherein the vertical illuminator comprises transparent reflecting means.

7. In combination with a compound microscope comprising in combination means for supporting an object at an object position, means for providing a beam of rays of light for illuminating the object, a condenser for concentrating the beam on to the object position, an objective focussed on to the object position for receiving the beam after it has left the object position and producing an enlarged real image of the object, and means for viewing the image, polarising means situated in the path of the beam before it reaches the object position, ray-dividing means, situated in the path of the beam between the polarising means and the object position, for dividing each ray in the beam into two coherent component rays and directing said two component rays along mutually different paths within the beam, birefringent ray-combining means, situated in the path of the beam after it has left the object position, for directing, by double refraction, said two component rays along colinear coincidental paths in the beam, and analysing means situated in the path of the beam after it has left the ray-combining means, for analysing the vibrations of the said component rays on a common azimuth, which ray-combining means comprises a birefringent member which by virtue of its birefringence presents mutually different optical path lengths to said two component rays, the difference between the optical path lengths presented to said two component rays being different from the corresponding mutual differences between the optical path lengths presented by said member to other pairs of coherent component rays derived from other rays in the beam, whereby when a transparent object to be examined and comprising portions having mutually different optical thicknesses is supported at the object position the image exhibits coincidentally viewable interference effects corresponding to the said portions of the object and resulting from the modification by the object of the relationship between the path lengths of at least one pair of the said mutually coherent component rays.

8. In combination with a compound microscope comprising in combination means for supporting an object at an object position, means for providing a beam of rays of light for illuminating the object, a condenser for concentrating the beam on to the object position, an objective focussed on to the object position for receiving the beam after it has left the object position and producing an enlarged real image of the object, and means for viewing the image, polarising means situated in the path of the beam before it reaches the object position, direct light transmitting birefringent ray-dividing means, situated in the path of the beam between the polarising means and the object position, for dividing, by double-refraction, each ray in the beam into two coherent component rays and directing said two component rays along mutually different paths within the beam, direct light transmitting birefringent ray-combining means, situated in the path of the beam after it has left the object position, for directing, by double-refraction, said two component rays along colinear coincidental paths in the beam, and analysing means situated in the path of the beam after it has left the ray-combining means, for analysing the vibrations of the said component rays on a common azimuth, which ray-dividing means and ray-combining means each comprises a birefringent member which by virtue of its birefringence presents mutually different optical path lengths to said two component rays, the difference between the optical path lengths presented to said two component rays being different from the corresponding mutual differences between the optical path lengths presented by said member to other pairs of coherent component rays derived from other rays in the beam, whereby when a transparent object to be examined and comprising portions having mutually different optical thicknesses is supported at the object position the image exhibits coincidentally viewable interference effects corresponding to the said portions of the object and resulting from the modification by the object of the relationship between the path lengths of at least one pair of the said mutually coherent component rays.

9. A combination according to claim 8, wherein the algebraic sum of the differences between the optical path lengths presented by the ray-dividing means and ray-combining means to each said pair of coherent component rays in the beam is the same for the pairs of component coherent rays derived from substantially all the rays in the beam, whereby in the absence of an object each pair of coherent component rays has the same mutual phase relationship as the other pairs of coherent component rays on leaving the ray-combining means.

10. A combination according to claim 9, wherein at least one birefringent member is situated in the path of the beam between the polariser and the analyser, which member is adjustable to vary the mutual optical path length relationship between two coherent component rays.

11. A combination according to claim 8, wherein the birefringent ray-dividing means and the birefringent ray-combining means each comprise a birefringent member having mutually different dioptric powers with respect to the said two coherent component rays, by virtue of its birefringence.

12. A combination according to claim 11, wherein the said birefringent members each comprise a birefringent lens having two mutually different focal lengths by virtue of its birefringence.

13. A combination according to claim 8, wherein the birefringent ray-dividing means and the birefringent ray-combining means each comprises a birefringent member having an optical birefringent thickness which varies symmetrically in each of all the planes intersecting in one selected axis of the member.

14. A combination according to claim 8, wherein the birefringent ray-dividing means and the birefringent ray-combining means each comprises a birefringent prism having two mutually different ray-deviating powers with respect to the said two coherent component rays, by virtue of its birefringence.

15. A combination according to claim 8, wherein the condenser and the objective are constituted by one and the same lens system, wherein the ray-dividing means and ray-combining means are constituted by a single means, and which combination also comprises reflecting means situated in the path of the beam, after it has left the object position, for directing the beam back to the said lens system, and a vertical illuminator situated in the path of the beam, between the beam-providing means and the said lens system, for directing the beam from the beam-providing means on to the said lens system while permitting the beam to pass the vertical illuminator to the image-viewing means.

16. A combination according to claim 15, wherein the vertical illuminator comprises transparent reflecting means.

FRANCIS HUGHES SMITH.

REFERENCES CITED

The following references are of record in the file of this patent:

UNITED STATES PATENTS

| Number | Name | Date |
|---|---|---|
| 2,014,688 | Mabboux | Sept. 17, 1935 |

(Other references on following page)

UNITED STATES PATENTS

| Number | Name | Date |
|---|---|---|
| 2,045,124 | Cummins et al. | June 23, 1936 |
| 2,105,671 | Roesch | Jan. 18, 1938 |
| 2,128,394 | Berek | Aug. 30, 1938 |
| 2,303,906 | Benford et al. | Dec. 1, 1942 |
| 2,427,689 | Osterberg et al. | Sept. 23, 1947 |
| 2,437,061 | Wright | Mar. 2, 1948 |
| 2,516,905 | Osterberg et al. | Aug. 1, 1950 |

FOREIGN PATENTS

| Number | Country | Date |
|---|---|---|
| 595,930 | France | July 27, 1925 |
| 386,315 | Great Britain | Jan. 12, 1933 |
| 636,168 | Germany | Oct. 7, 1936 |

OTHER REFERENCES

Journal of the Optical Society of America, vol. 37, September 1947, pages 726–730, Osterberg article "The Polanret Microscope"; Publ. American Institute of Physics, New York, New York.

Hardy and Perrin Text, The Principles of Optics, 3rd ed., 1932, page 591, Publ. McGraw-Hill Book Co., New York, New York.